May 13, 1930. E. E. HINRICHSEN Re. 17,666
TELEPHONE SYSTEM
Original Filed May 26, 1927
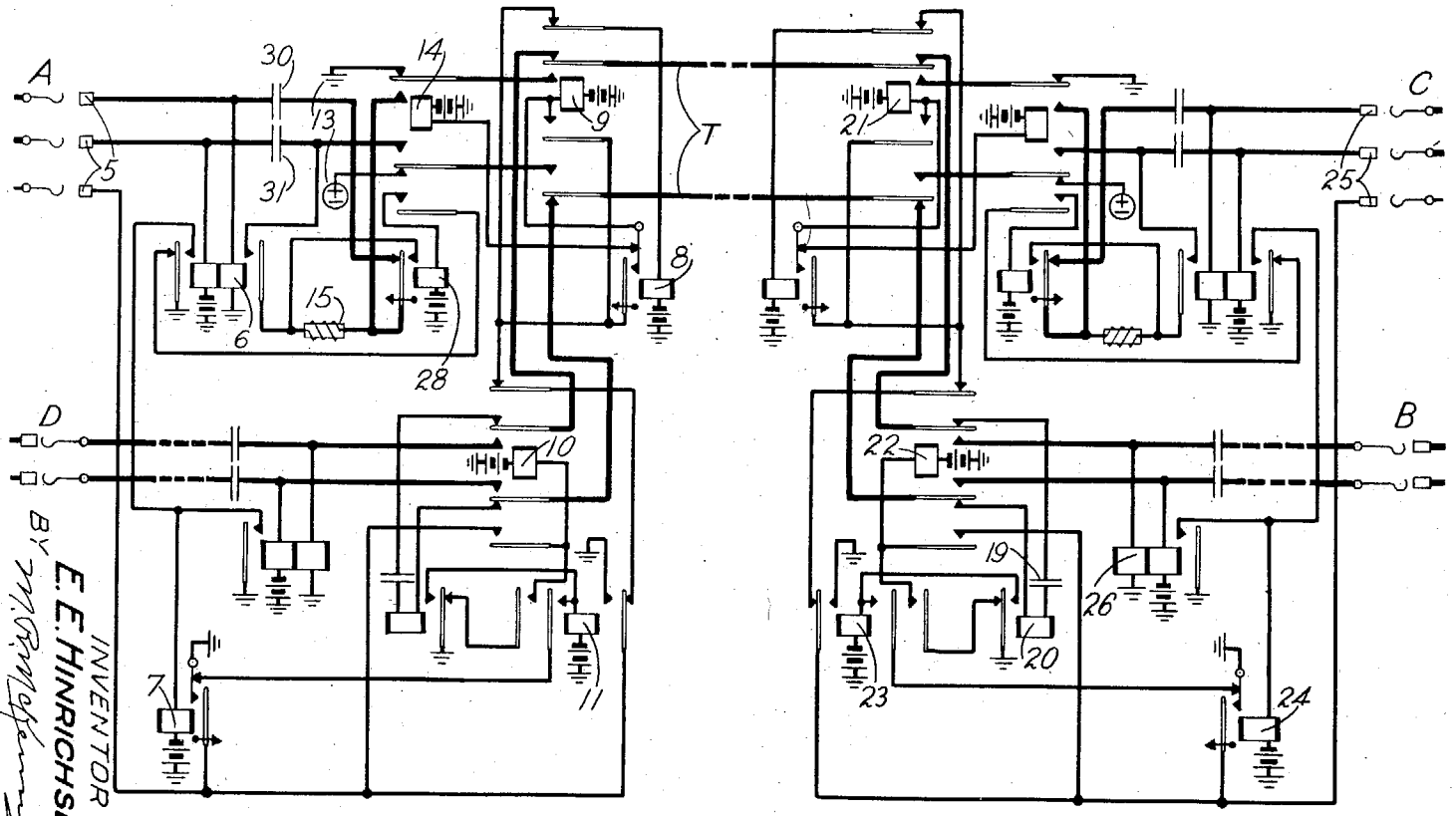
INVENTOR
E. E. HINRICHSEN
BY M. P. McKenney
ATTORNEY Reissued May 13, 1930 Re. 17,666

UNITED STATES PATENT OFFICE

EDWARD E. HINRICHSEN, OF NEW YORK, N. Y., ASSIGNOR TO BELL TELEPHONE LABORATORIES, INCORPORATED, OF NEW YORK, N. Y., A CORPORATION OF NEW YORK

TELEPHONE SYSTEM

Original No. 1,689,343, dated October 30, 1928, Serial No. 194,323, filed May 26, 1927. Application for reissue filed March 8, 1930. Serial No. 434,435.

This invention relates to telephone systems and its object is to improve two-way trunks that may be automatically seized or extended at either end.

A feature of the invention is an arrangement whereby a current impulse is transmitted over a trunk of this type when seized at one end to disable the automatic seizing means and cause the connection of the automatic extension means at the other end of the trunk.

Another feature of the invention is an arrangement comprising means operative in response to the preparation of the trunk for the automatic extension of the connection, to supply operating current at the called end for the automatic extension of a connection under control of a dialing bridge established at the calling end.

The invention has been illustrated in the accompanying drawing by a trunk circuit connecting two stations and showing identical equipments at both stations for automatic seizure and for automatic extensions of the trunk circuit.

Referring now to the drawing, a description will be made of the functions of these circuits when a connection through the trunk T is extended from a selector, the brushes only of which have been shown at A, at one station to a connector, the brushes only of which have been shown at B, at the other station. This description will be sufficient to illustrate the features of this invention as it should be understood that the operations for extending connections in the oposite direction over trunk T from a selector at C to a connector at D are identical. The selectors at A and C and the connectors at B and D may be of any well-known step-by-step type and, as such apparatus forms no part of this invention, they have merely been indicated in diagrammatic form. The particular trunk circuit arrangement shown employs alternating current for the operating impulse.

Assuming, then, that a selector at A has seized the terminals 5 of the trunk T, a connection will thereby be established, as is well-known in the art, from a loop through the selector to battery and ground through the windings of the usual pulsing relay 6. Relay 6 operates in this circuit and closes an obvious connection for the operation of relay 7 and also at its right-hand armature and front contact prepares a circuit for a bridge to be established later across the tip and ring conductors of trunk T. Relay 7, in operating, connects ground to the sleeve terminal of the group of terminals 5 to hold the connected selector and to make the trunk busy to other selectors, as is well known in the art. This ground, which is supplied at the armature and front contact of relay 7, is also connected to a circuit for the operation of relay 8 as follows: battery, winding of relay 8, upper outer armature and back contact of relay 9, upper outer armature and back contact of relay 10, right-hand armature and back contact of relay 11 to ground at the armature and front contact of relay 7. Relay 8, in operating, closes a circuit for the operation of relay 9 as follows: battery, winding of relay 9, armature and front contact of relay 8, upper outer armature and back contact of relay 10, right-hand armature and back contact of relay 11 to ground at the armature and front contact of relay 7. Relay 9, in operating, provides a locking circuit for itself to ground at the armature and front contact of relay 7 through its lower inner armature and front contact. The operation of relay 9 closes at its upper inner and lower outer armatures and front contacts a connection from the ringing source at 13 to the tip and ring conductors of trunk T for transmission of an alternating current impulse to the other end of the trunk. Relay 9, in operating, also opens the energizing circuit for relay 8. Relay 8, however, is slow in releasing so that the circuit through its make-before-break contacts will be delayed for a short period so as to permit the alternating current impulse from source 13 to be of sufficient duration to perform certain operations at the distant end of the trunk as will hereinafter be described. It should be noted that a circuit is closed on the release of relay 8 for actuating relay 14. This circuit may be traced from battery through the winding of relay 14, make-before-break contacts of relay 8, lower inner armature and front contact of relay 9 to ground at the armature and front contact of relay 7. Relay 14 in operating opens the connection from the source 13 to the tip and ring conductors of trunk T so that the time of application of the impulse to the trunk T will be determined by the time it takes for relay 9 to operate, relay 8 to release and relay 14 to respond. The operation of relay 14 also connects the tip and ring conductors of the trunk together through retardation coil 15. The bridge circuit for this retardation coil may be traced from the tip conductor, the inner upper armature and front contact of relay 9, upper armature and front contact of relay 14, retardation coil 15, right-hand armature and front contact of relay 6, lower inner armature and front contact of relay 14, lower armature and front contact of relay 9 to the ring conductor.

The alternating current impulse from source 13 supplied through trunk T actuates the alternating current responsive relay 20 over the circuit from the tip conductor, upper inner armature and back contact of relay 21, upper inner armature and back contact of relay 22, condenser 19, winding of relay 20, lower inner armature and back contact of relay 22, lower outer armature and back contact of relay 21 to the ring conductor. Relay 20, in operating closes an obvious circuit for relay 23. Relay 23, in operating, provides a locking circuit for itself through its inner right-hand armature and front contact to ground at the make-before-break contacts of relay 24. Relay 23, in operating, also connects ground at its left-hand armature and front contact for the sleeve terminal of the group of terminals 25 through which the trunk T may be seized from a selector at C so that these terminals are made busy as long as a connection is established over trunk T from a selector at A.

When the impulse ceases, relay 20 is released and thereby opens the original energizing circuit for relay 23 and closes a circuit for the operation of relay 22 as follows: battery, winding of relay 22, outer right-hand armature and front contact of relay 23, armature and back contact of relay 20 to ground. Relay 22 in operating, provides a locking circuit for itself through the lower outer armature and front contact to the ground at the left-hand armature and front contact of relay 23. Relay 22 also completes a connection from the trunk T for the operation of relay 26. This circuit may be traced from battery through the right-hand winding of relay 26, lower inner armature and front contact of relay 22, lower outer armature and back contact of relay 21, ring conductor of trunk T through the loop provided through the retardation coil 15, previously traced back to the tip conductor of trunk T, upper inner armature and back contact of relay 21, upper inner armature and front contact of relay 22, left-hand winding of relay 26 to ground. Relay 26, in operating, closes an obvious circuit for the operation of relay 24. This relay, in operating, provides a substitute locking circuit for relay 22 at its armature and front contact and a substitute ground for the sleeve terminal of the terminals 25. It should be noted that on the operation of this relay the locking circuit for relay 23 is opened at the make-before-break contact so that this relay will now release and, in releasing, opens the operating circuit as well as the original locking circuit for relay 22, and removes the original ground connection for the sleeve terminal of the group 25.

It should be understood that the relay 26 may control the connector at B to select a desired line as it is controlled by dialing impulses incoming from the selector at A. None of the circuits for the connector at B have been shown, as any connector well known in the art may be employed. As the connector forms no part of this invention it is only necessary to show how relay 26 may be actuated by dialing impulses incoming from the selector at A. When such impulses are received from the selector at A, relay 6 will be alternately released and operated in accordance with the digits of the number wanted. The first release of relay 6 closes a circuit for the operation of relay 28 as follows: Battery, winding of relay 28, lower armature and front contact of relay 14, left-hand armature and back contact of relay 6 to ground. Relay 28 is slow to release, so that it will remain operated during the succeeding impulses and release only between digits. The operation of relay 28 closes at its armature and front contact a shunt for the retardation coil 15 in the bridge across the tip and ring conductors of trunk T. When relay 6 releases in response to impulses, the bridge circuit is opened at the right-hand armature and the front contact of this relay, and relay 26 will therefore release each time relay 6 releases and operate each time relay 6 is operated. When the impulses of the first digit have been transmitted, relay 28 releases and replaces the retardation coil 15 in the bridge across the tip and ring conductors so as to maintain relay 26 operated between digits to prevent the false operation of the operating circuits in the connector at B. Relay 24 is slow to release so that it will remain operated during the release periods of relay 26. When the connector at B has established a connection with the wanted subscriber's line; this subscriber has been automatically rung and the called subscriber answered the call in the usual manner, the connection from the subscriber connected through the selector at A is completed for talking purposes to the called subscriber's line through the condensers 30 and 31.

If the subscriber connected through the selector at A hangs up his receiver, relay 6 will release, and this relay, in releasing, opens the circuit for relay 7. Relay 7, in releasing, opens the holding circuit for relays 9 and 14 which are thereby released to open the connection from the selector at A through trunk T. The ground on the sleeve terminal of the terminals 5 is also removed so as to release the selector at A and to make this trunk available to other selectors. The release of relay 9 opens the circuit for relay 26, which is now released. Relay 26 in releasing causes the return of the connector at B to normal position and also causes the release of relay 24 which removes the ground from the sleeve terminal of the terminals 25 and opens the holding circuit for relay 22. Relay 22 releases and connects the alternating current relay 20 to the trunk T and thereby restores the circuits to normal.

It should be understood that the operations of these trunk circuits when a connection is desired from a selector at C to a connector at D, are identical with the operations hereinbefore described for a connection in the opposite direction.

Although the invention has been shown and described in connection with but one circuit arrangement employing alternating current for the operating impulse, it should be understood that this should be taken merely as an illustration of one application of the invention; that the features of the invention may be equally well applied to other two-way trunking systems and that an operating impulse of different current characteristics may be employed without departing from the spirit of the invention.

What is claimed is:

1. In a telephone system, a two-way trunk, means for automatically seizing said trunk at either end, means for automatically extending said trunk at either end, means responsive to the seizure of the trunk at one end for transmitting a current impulse to the opposite end, means at said opposite end responsive to said current impulse for disabling the trunk seizing means and responsive to the cessation of said impulse for connecting the trunk extending means to the trunk at said end.

2. In a telephone system, a normally dry two-way trunk connecting two stations, means for seizing and extending the trunk at either station, means responsive to the seizure of the trunk at one station for preparing the trunk at the other station for extending a connection thereat from said trunk, and means controlled by said last mentioned means for supplying operating current at the second station controllable from the first station to actuate the extension means at the second station.

3. In a telephone system, a normally dry two-way trunk connecting two stations, means for seizing and extending the trunk at either station, means responsive to the seizure of the trunk at one station including means for the transmission of an alternating current impulse from said station, for preparing the trunk at the other station for the extension of a connection therefrom, and means controlled by said impulse for supplying operating current at the second station controllable from the first station to actuate said extension means at said second station.

4. In a telephone system, a two-way trunk, means for automatically seizing said trunk at either end, means for automatically extending said trunk at either end, means responsive to the seizure of said trunk at one end for transmitting an alternating current impulse to the opposite end, means at the opposite end responsive to said alternating current impulse for disabling the trunk seizing means and for connecting the trunk extending means to said trunk at said second end, and for supplying operating current from said second end for actuating the connected trunk extension means under the control of impulses received through the seizing means at the originating end.

5. In a telephone system, a two-way trunk, means for seizing said trunk at either end, means for extending said trunk at either end including a relay having two windings connected respectively to ground and battery, means responsive to the seizure of said trunk at one end for transmitting a momentary current impulse to the opposite end and for thereafter establishing a bridged connection at said end across the tip and ring conductors of said trunk, and means at the opposite end responsive to said momentary impulse for disabling the trunk seizing means at said end, and for establishing a connection from battery to ground through the windings of said relay, the tip and ring conductors and the bridge.

6. In a telephone system, a two-way trunk, means for automatically seizing said trunk at either end, means for automatically extending said trunk at either end, means for transmitting a current impulse from one end of the trunk in response to the actuation of the seizing means at that end, a source of battery at each end normally disconnected from the trunk, means responsive to said impulse at the other end of the trunk for disabling the seizing means at said other end, and for connecting the source of battery and the trunk extending means at said other end to the trunk.

7. In a telephone system, a two-way trunk, means for automatically extending said trunk and for automatically seizing said trunk at either end, a source of battery at each end normally disconnected from the trunk, and means responsive to the seizing of the trunk by the seizing means at one end for disabling the seizing means at the other end and for connecting the trunk extending means and the source of battery at that end to the trunk.

New York, New York, February 20, 1930.

EDWARD E. HINRICHSEN.